(12) United States Patent
Jiang et al.

(10) Patent No.: US 11,811,559 B2
(45) Date of Patent: Nov. 7, 2023

(54) LOGICAL NETWORK PACKET HANDLING ON PHYSICAL NETWORK INTERFACE CONTROLLER (PNIC)

(71) Applicant: VMware, Inc., Palo Alto, CA (US)

(72) Inventors: Wenyi Jiang, Palo Alto, CA (US); Boon Seong Ang, Saratoga, CA (US); Guolin Yang, San Jose, CA (US); Ying Gross, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 70 days.

(21) Appl. No.: 16/934,019

(22) Filed: Jul. 21, 2020

(65) Prior Publication Data

US 2022/0029858 A1 Jan. 27, 2022

(51) Int. Cl.
*H04L 12/46* (2006.01)
*H04L 41/0893* (2022.01)
*H04L 43/028* (2022.01)
*H04L 49/00* (2022.01)
*G06F 9/455* (2018.01)

(52) U.S. Cl.
CPC ...... *H04L 12/4645* (2013.01); *G06F 9/45558* (2013.01); *H04L 12/4633* (2013.01); *H04L 41/0893* (2013.01); *H04L 43/028* (2013.01); *H04L 49/70* (2013.01); *G06F 2009/45579* (2013.01); *G06F 2009/45595* (2013.01)

(58) Field of Classification Search
CPC ............. H04L 12/4645; H04L 12/4633; H04L 41/0893; H04L 43/028; H04L 49/70; G06F 9/45558; G06F 2009/45579; G06F 2009/45595
See application file for complete search history.

(56) References Cited

U.S. PATENT DOCUMENTS

| | | | |
|---|---|---|---|
| 8,930,690 B2 * | 1/2015 | Zuo | H04L 47/20 713/162 |
| 9,912,774 B2 * | 3/2018 | Daly | H04L 69/22 |
| 9,942,148 B1 | 4/2018 | Sivaramakrishnan et al. | |
| 11,108,593 B2 | 8/2021 | Cherian et al. | |
| 2013/0061047 A1 | 3/2013 | Sridharan et al. | |
| 2016/0232019 A1 * | 8/2016 | Shah | G06F 9/45558 |

(Continued)

OTHER PUBLICATIONS

Non-Published Commonly Owned U.S. Appl. No. 16/934,020, filed Jul. 21, 2020, 52 pages, VMware, Inc.

*Primary Examiner* — Mohammad S Anwar
(74) *Attorney, Agent, or Firm* — SU IP CONSULTING

(57) ABSTRACT

Example methods and systems for logical network packet handling are described. In one example, a physical network interface controller (PNIC) may receive an egress packet associated with a packet flow via a first virtual function supported by the PNIC. The PNIC may steer the egress packet towards a processing pipeline by applying a filter associated with the first virtual function or content of the egress packet, or both. The egress packet may be processed using the processing pipeline to generate a processed packet by (a) retrieving a logical network policy associated with the packet flow from a datastore on the PNIC and (b) performing one or more actions according to the logical network policy. The processed packet may be forwarded towards the destination via a second virtual function supported by the PNIC or a physical network connected to the PNIC.

18 Claims, 13 Drawing Sheets

(56) References Cited

U.S. PATENT DOCUMENTS

| | | | |
|---|---|---|---|
| 2016/0285830 A1* | 9/2016 | Dong | ............ H04L 49/00 |
| 2017/0367611 A1 | 12/2017 | Dobin | |
| 2018/0309595 A1 | 10/2018 | Ma | |
| 2019/0065265 A1 | 2/2019 | Wang et al. | |
| 2019/0363977 A1 | 11/2019 | Lim | |
| 2019/0386882 A1 | 12/2019 | DeCusatis et al. | |

* cited by examiner

500

| Virtual Function (VF-i) | Queue Filters FILTER=(DMAC,TAG) for RXQ-i |
|---|---|
| VF0 TAG=VLAN0 510 | LOCAL-L2 FILTER1: (MAC-VF1,VLAN0) 511 |
| | LOCAL-L3/REMOTE-L3 FILTER2: (MAC-VDR,VLAN0) 512 |
| | REMOTE-L2 FILTER3: (MAC-X,VLAN0) 513 |
| VF1 TAG=VLAN1 511 | LOCAL-L2 FILTER4: (MAC-VF0,VLAN1) 521 |
| | LOCAL-L3/REMOTE-L3 FILTER5: (MAC-VDR,VLAN1) 522 |
| | REMOTE-L2 FILTER3: (MAC-X,VLAN1) 523 |

LOGICAL NETWORK PACKET HANDLING ON PHYSICAL NETWORK INTERFACE CONTROLLER (PNIC)

CROSS-REFERENCE TO RELATED APPLICATION

The present application is related in subject matter to U.S. patent application Ser. No. 16,934,020, which is incorporated herein by reference.

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, it is desirable for hosts to support logical network packet handling to facilitate communication among VMs deployed on various logical networks.

BRIEF DESCRIPTION OF DRAWINGS

FIG. 5 is a schematic diagram illustrating example tag and filter configuration to facilitate logical network packet handling on a PNIC;

DETAILED DESCRIPTION

Figure 1:
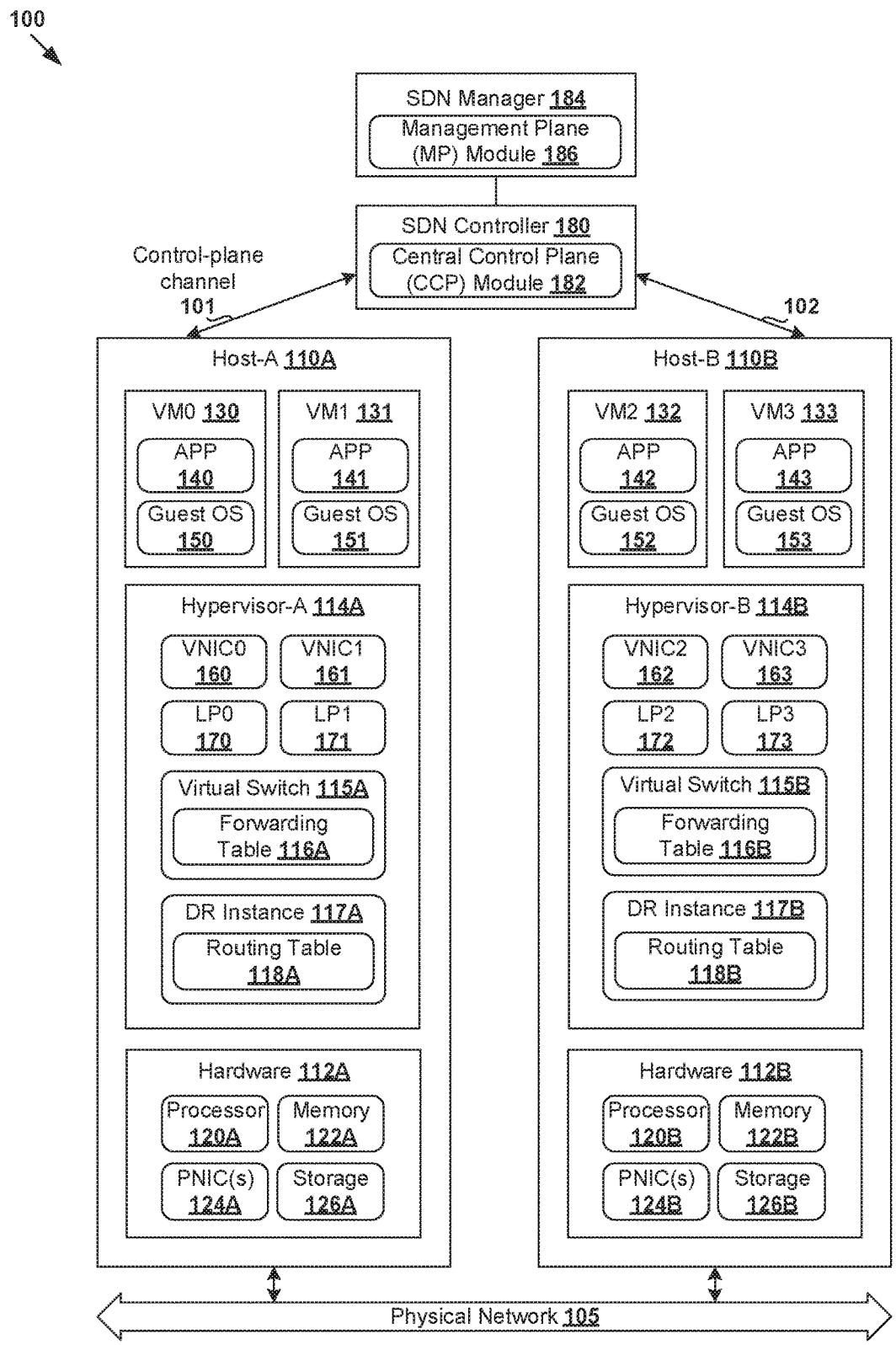
FIG. 1 is a schematic diagram illustrating an example software-defined networking (SDN) environment in which logical network packet handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to logical overlay networks will now be explained in more detail using FIG. 1, which is a schematic diagram illustrating example software-defined networking (SDN) environment 100 in which logical network packet handling may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 130-133. Hardware 112A/112B includes suitable physical components, such as central processing unit(s) (CPU(s)) or processor(s) 120A/120B; memory 122A/122B; physical network interface controllers (PNICs) 124A/124B (to be discussed further using FIG. 2); and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 130-133 to each support a guest operating system (OS) and application(s); see 140-143 and 150-153. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 160-163 are virtual network adapters for VMs 130-133, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" (L2) may refer generally to a link layer or media access control (MAC) layer; "layer-3" (L3) to a network or Internet Protocol (IP) layer; and "layer-4" (L4) to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 170-173 are associated with respective VMs 130-133. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as logical overlay networks) may be provisioned, changed, stored, deleted and restored programmatically without having to reconfigure the underlying physical hardware architecture. To facilitate logical network traffic among VMs 130-133, host 110A/110B may encapsulate and decapsulate packets with an outer header identifying a logical overlay network. For example, a logical overlay tunnel may be established between a pair of virtual tunnel endpoints (VTEPs) implemented by respective hosts 110A-B. For example, hypervisor-A 114A may implement a first VTEP (not shown) associated with (IP address=IP-A, MAC address=MAC-A, VTEP label=VTEP-A) and hypervisor-B 114B a second VTEP (not shown) with (IP-B, MAC-B, VTEP-B). Encapsulated packets may be sent via a logical overlay tunnel established between a pair of VTEPs over physical network 105, over which respective hosts 110A-B are in layer-3 connectivity with one another. Any suitable tunneling protocol may be used, such as Virtual eXtensible Local Area Network (VXLAN), Stateless Transport Tunneling (STT), Generic Network Virtualization Encapsulation (GENEVE), etc.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Input/Output (I/O) Virtualization

Figure 2A:
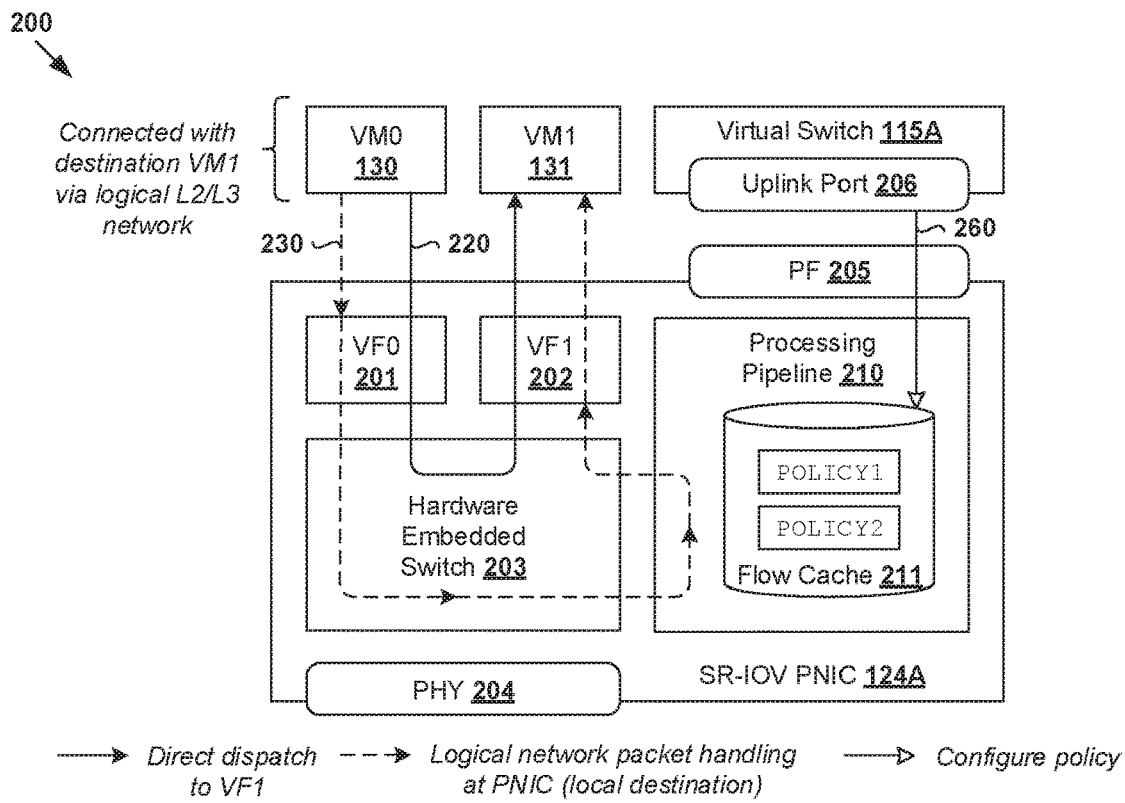
FIG. 2A is a schematic diagram illustrating a first example of logical network packet handling on a physical network interface controller (PNIC)
Figure 2B:
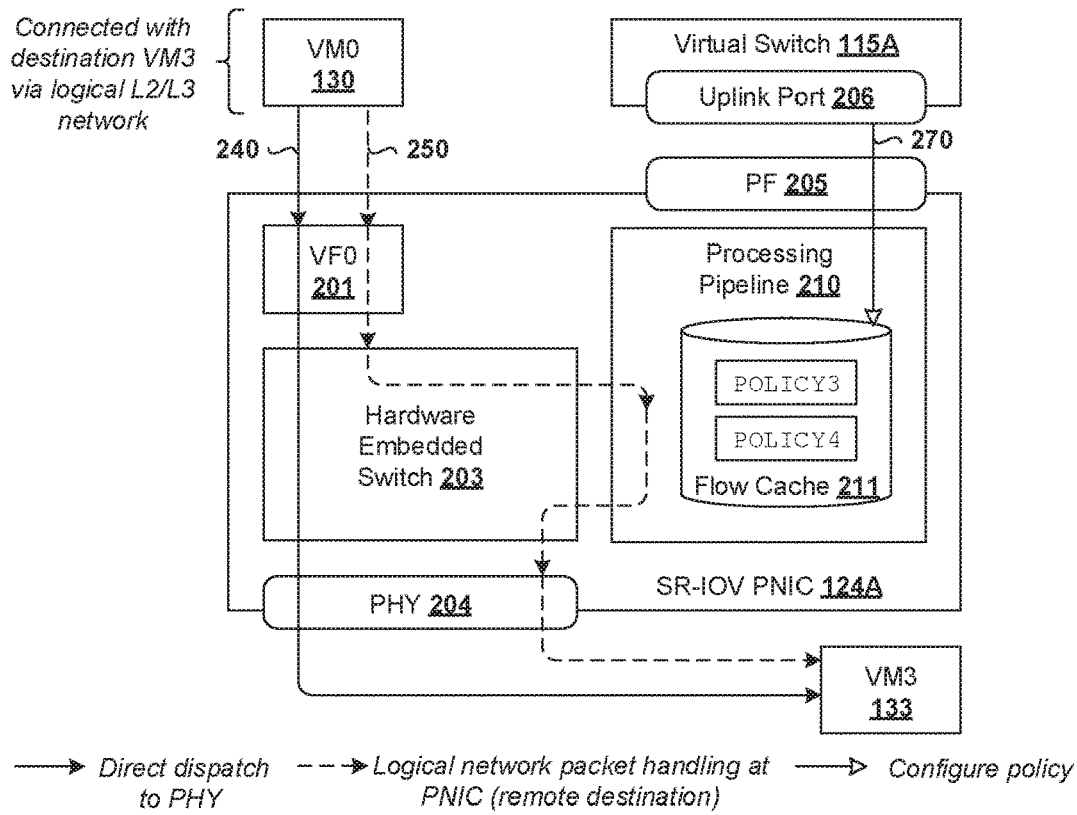
FIG. 2B is a schematic diagram illustrating a second example of logical network packet handling on a PNIC.

In the example in FIG. 1, PNICs 124A-B on respective hosts 110A-B be enabled with any suitable I/O virtualization technology, such as single root I/O virtualization (SR-IOV), etc. Through I/O virtualization, PNIC 124A/124B may be virtualized into multiple independent devices that are accessible by respective VMs 130-134 and hypervisors 114A-B. Some examples will be discussed using FIG. 2A and FIG. 2B, where FIG. 2A is a schematic diagram illustrating a first example of logical network packet handling on PNIC 124A and FIG. 2B is a schematic diagram illustrating a second example of logical network packet handling on PNIC 124A. Here, PNIC 124A on host-A 110A may be enabled with SR-IOV, which is a specification that allows a single Peripheral Component Interconnect express (PCIe) under a single root port to appear as multiple independent devices. In general, there are two types of SR-IOV network ports implemented by PNIC 124A/124B.

(a) A first type of network port on PNIC 124A is a physical function (PF) that is generally used by hypervisor 114A, such as PF 205 that is accessible by virtual switch 115A via uplink port 206. In practice, the term "physical function" or "PF" of PNIC 124A/124B may also refer to PCIe function(s) that have access to a full set of configuration resources. For example, hypervisor 114A may manage and configure I/O resources of PNIC 124A through PF 205.

(b) A second type of network port on PNIC 124A is a virtual function (VF) port that is generally assigned to a particular VM. For example in FIG. 2A, PNIC 124A enabled with SR-IOV may support multiple VFs, including VF0 201 ("first virtual function") assigned to VM0 130; VF1 202 ("second virtual function") assigned to VM1 131, etc. In practice, the term "virtual function" or "VF" may also refer to lightweight function(s) that have access to a reduced set of configuration resources compared to a PF. Each VF 201/202 may represent a slice of the hardware resources of PNIC 124A.

PNIC 124A may further include a hardware embedded (L2) switch (see 203) that is capable of switching packets among VFs 201-202 to support local packet handling and to/from a physical port (see PHY 204) that is connected to physical network 105 to support remote packet handling. Hardware embedded switch 203 may also be configured to switch packets to and from PF 205. Here, the term "local" may refer to a scenario where a source and a destination both reside on the same host, such as VM0 130 and VM1 131 on host-A 110A in FIG. 2A. The term "remote" may refer to another scenario where a source and a destination reside on different hosts, such as between VM0 130 on host-A 110A and VM3 133 on host-B 110B in FIG. 2B.

In practice, VMs 130-134 may be deployed on any suitable logical network(s). As used herein, the term "logical network" may refer generally to a logical L2 network or logical L3 network. In the "logical L2 network" case, a source and a destination may be connected via a logical switch, which may span multiple hosts 110A-B and implemented using forwarding tables 116A-B in FIG. 1. In the "logical L3 network" case, a source and a destination may be attached to different logical L2 switches that are connected via a logical L3 router, which may span multiple hosts 110A-B and implemented using routing tables 118A-B in FIG. 1. As such, for source=VM0 130 and destination=VM1 131 in FIG. 2A, a "local" packet may be forwarded over a logical L2 network or a logical L3 network connecting them. For source=VM0 130 and destination=VM3 133 in FIG. 2B, "remote" packet may be forwarded over a logical L2 network or a logical L3 network.

Conventionally, PNIC 124A/124B enabled with I/O virtualization may not be capable of handling logical network packets, which affect communication among VMs 130-134 deployed on various logical networks. For example, hardware embedded switch 203 is generally not a learning switch and requires explicit programing of destination MAC addresses. In the example in FIG. 2A (see 220), hardware embedded switch 203 may implement a direct dispatch approach to switch logical L2 packets from VM0 130 to VM1 131 via respective VF0 201 and VF1 202 without any additional processing. In another example in FIG. 2B (see 240), the direct dispatch approach may be used to switch remote L2/L3 packets from VM0 130 via PHY 204 without any additional processing (e.g., encapsulation). Such conventional approaches are generally inadequate for logical network packets.

Logical Network Packet Handling

According to examples of the present disclosure, logical network packet handling may be implemented on PNIC 124A enabled with I/O virtualization in an improved manner. In particular, instead of using a direct dispatch approach, logical network packets may be steered towards a processing pipeline (see 210 in FIGS. 2A-B) that is capable of processing the packets according to a logical network policy. As used herein, the term "processing pipeline" may refer generally to software and/or hardware component(s) on PNIC 125A that are capable of packet processing and implementing any suitable logical network policy according to examples of the present disclosure. The term "logical network policy" may refer generally to a set of match field(s) and corresponding action(s) on a logical network packet in the event of a match.

Figure 3:
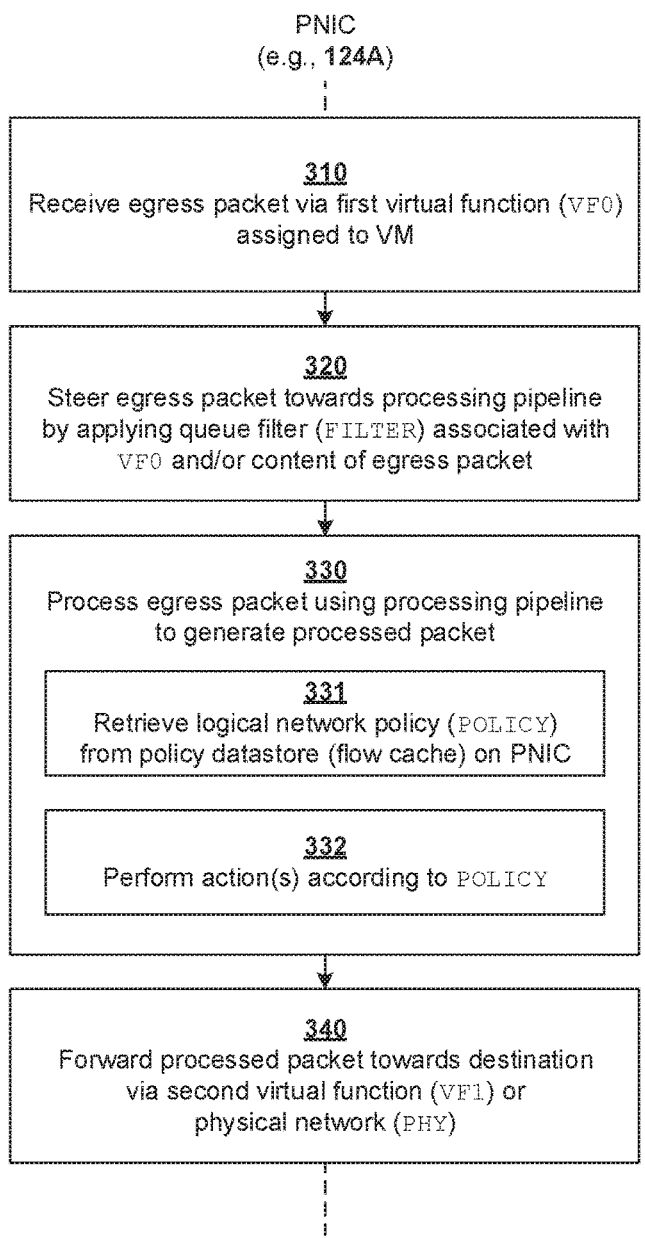
FIG. 3 is a flowchart of an example process for a PNIC to perform logical network packet handling in an SDN environment.

In more detail, FIG. 3 is a flowchart of example process 300 for PNIC 124A to perform logical network packet handling in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In the following, various examples will be explained using PNIC 124A, VM0 130 as an example "virtualized computing instance," etc.

At 310 in FIG. 3, PNIC 124A may receive an egress packet associated with a packet flow may be received from source=VM0 130 to a destination over a logical network. For example in FIGS. 2A-B, the egress packet may be received via first virtual function=VF0 201 supported by PNIC 124A and assigned to VM0 130.

At 320 in FIG. 3, PNIC 124A may steer the egress packet towards processing pipeline 210 supported by PNIC 124A. Block 320 may involve applying a filter associated with first virtual function=VF0 201 or content of the egress packet (e.g., DMAC=destination MAC address), or both. As will be described using FIGS. 4-5, the filter may be applied by hardware embedded switch 203 based on a logical network tag attached to the egress packet. The logical network tag may identify a virtual local area network (VLAN) or virtual network identifier (VNI) associated with the first virtual function.

At 330 in FIG. 3, PNIC 124A may process the egress packet using the processing pipeline to generate a processed packet. Block 330 may involve (a) retrieving a logical network policy associated with the packet flow from a datastore on the PNIC and (b) performing one or more actions according to the logical network policy. See 331-332 in FIG. 3. Depending on the logical network policy, the processed packet may have the same content as the egress packet, or different content (e.g., header information modification, encapsulation, decapsulation, etc.).

At 340 in FIG. 3, PNIC 124A may forward the processed packet towards the destination via a second virtual function (e.g., VF1 202) supported by PNIC 124A or physical network 105 connected to PNIC 124A. This way, instead of dispatching the egress packet directly to another virtual function (e.g., VF1 202) or physical network 105 via PHY 204.

As will be described using FIGS. 4-7, examples of the present disclosure may be implemented for handling egress packets for transmission to a local destination (e.g., VM1 131) over a logical L2/L3 network. For example in FIG. 2A, egress packets (see 230) from VM0 130 to VM1 131 may be steered towards processing pipeline 210 instead of being dispatched to VF1 202 or PHY 204 directly.

As will be described using FIGS. 8-9, examples of the present disclosure may be implemented for handling egress packets for transmission to a remote destination (e.g., VM3 133) over a logical L2/L3 network. For example in FIG. 2A, egress packets (see 230) from VM0 130 to VM3 133 may be steered towards processing pipeline 210 instead of being dispatched to PHY 204 directly.

Depending on the desired implementation, PNIC 124A may be configured to implement any suitable logical network policies to support local L2/L3 traffic handling (see FIGS. 6-7), remote L2/L3 traffic handling (see FIGS. 8-9), ingress traffic handling (see FIGS. 11-12), or any combination thereof. For example, action(s) specified by a logical network policy may relate to switching, routing, encapsulation, decapsulation, firewall, packet inspection, intrusion detection or prevention, load balancing, network address translation (NAT), inband network telemetry (INT), IP flow information export (IPFIX) functionality, mirroring, virtual private network (VPN), any combination thereof, etc. A logical network policy may be configured on PNIC 124A and stored in a local datastore (e.g., flow cache 211 in FIGS. 2A-B) based on any suitable instruction from virtual switch 115A (see 260 in FIG. 2A and 270 in FIG. 2B). As will be described using FIG. 6 and FIG. 8 (i.e., slow path scenario), policy configuration may be triggered by forwarding a prior egress packet to virtual switch 115A.

Tag and Filter Configuration

Figure 4:
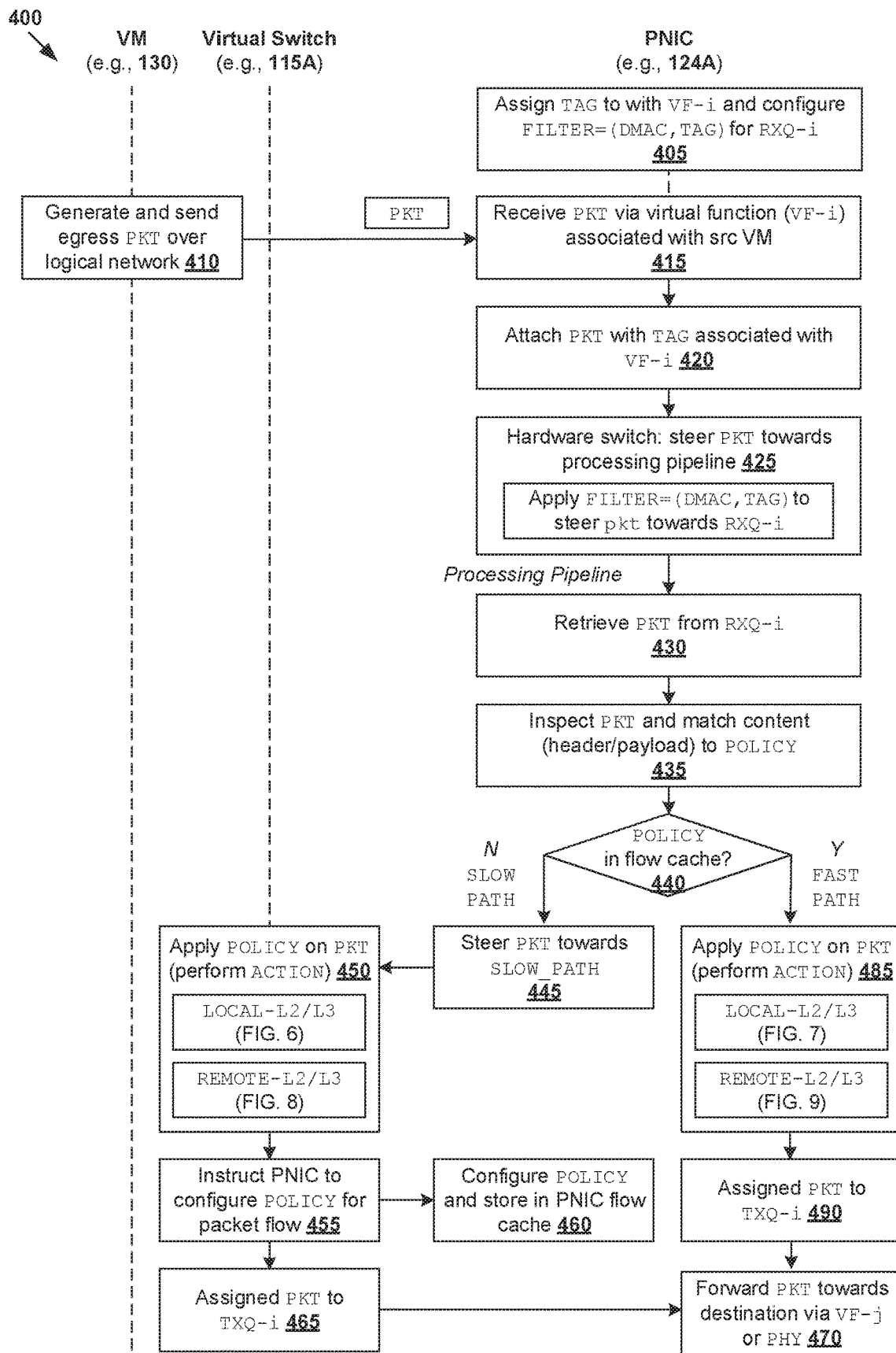
FIG. 4 is a flowchart of an example detailed process for logical network packet handling on a PNIC in an SDN environment.

According to examples of the present disclosure, logical network packet handling on PNIC 124A may be improved by steering packets sent via one VF (e.g., VF0 201) towards processing pipeline 210. To facilitate packet steering and logical network policy enforcement, various tags and filters may be configured as follows. In particular, FIG. 4 is a flowchart of example detailed process 400 for logical network packet handling on PNIC 124A in SDN environment 100. Example process 400 may include one or more operations, functions, or actions illustrated at 405 to 490. The various operations, functions or actions may be combined into fewer blocks, divided into additional blocks, and/or eliminated depending on the desired implementation.

At 405 in FIG. 4, PNIC 124A may be configured to support logical network packet handling using various logical network tags and receive (RX) queue filters. For each VF 201/202 created on PNIC 124A, a unique logical network tag may be assigned to VF 201/202. One example tag may be a VLAN ID assigned to VF 201/202. Another example tag may be a VNI that is uniquely associated with VF 201/202. Note that the VLAN ID or VNI tag may be configured for internal use on PNIC 124A only and not exposed to physical network 105 or a networking stack. A VLAN ID assigned to VF 201/202 is not used for physical transport VLAN.

Some examples are shown in FIG. 5, which is a schematic diagram illustrating example tag and filter configuration 500 to facilitate logical network packet handling on PNIC 124A. Here, PNIC 124A may be configured with multiple (N) VFs denoted as VFi, where i=0, . . . , N−1. The case of N=2 is shown for example using VF0 (i=0) and VF1 (i=1). At 510 in FIG. 5 (i=0), VF0 201 in FIG. 2 may be assigned with a VLAN ID tag=VLAN0. At 520 in FIG. 5 (i=1), VF1 202 in FIG. 2 may be assigned with a VLAN ID tag=VLAN1. In practice, packets received by PNIC 124A via VF0 201 may be tagged with "VLAN0," such as before the packets arrive at hardware embedded switch 203. Similarly, packets received via VF1 202 may be tagged with "VLAN1."

Block 405 may further involve configuring queue filters for each VF 201/202. In practice, VF 201/202 may be assigned with a pair of transmit queue (TXQ) and receive queue (RXQ) supported by PNIC 124A. For example, queues "RXQ-0" 214 and "TXQ-0" 215 are assigned to VF0 201, and "RXQ-1" 212 and "TXQ-1" 213 to VF1 202, etc. Depending on the desired implementation, multiple VFs may share the same pair of queues. To support logical network packet handling, queue filters in the form of FILTER=(DMAC, TAG) may be configured, where DMAC=destination MAC address and TAG=VLAN ID assigned to VF0 201.

Filters 511-513 in FIG. 5 may be configured for packets received via VF0 201. At 511 (see "LOCAL-L2"), FILTER1=(MAC-VF1, VLAN0) may be configured for local logical L2 network traffic for destination VF1 202. At 512 (see "LOCAL-L3" and "REMOTE-L3"), FILTER2=(MAC-VDR, VLAN0) may be configured for local logical L3 network traffic or remote logical L3 network traffic for a remote destination. At 513 (see "REMOTE-L2"), FILTER3=(MAC-X, VLAN0) may be configured for logical L2 network traffic for a remote destination. Remote destinations are accessible via physical network 105.

Filters 521-523 in FIG. 5 may be configured for packets received via from source VF1 202. At 521, FILTER4=(MAC-VF1, VLAN1) may be configured for local logical L2 network traffic to destination VF0 201. At 522, FILTER5=(MAC-VDR, VLAN1) may be configured for local logical L3 network traffic as well as remote logical L3 network traffic for a remote destination. At 523, FILTER6=(MAC-X, VLAN1) may be configured for remote logical L2 network traffic from source VF1 202 to a remote destination.

By configuring the filters in FIG. 5, a VF's MAC address may be programmed on another VF's VLAN ID on that VF's RXQ. A logical router's MAC address (e.g., MAC-VDR) may be programmed on each VF's RXQ along with the VF's VLAN ID. A remote destination MAC address (e.g., MAC-X) may be programmed when a packet is sent to a local VF and has a flow miss.

For ingress traffic, FILTER7=(outer DMAC=MAC-LOCAL-VTEP) may also be programmed on PNIC 124A, where MAC-LOCAL-VTEP is a MAC address associated with a local virtual tunnel endpoint (VTEP). When FILTER7 is applied, ingress encapsulated packets may be steered towards a default queue on processing pipeline 210. Ingress logical network traffic handling will be explained further using FIGS. 10-13.

Local L2/L3 Traffic (Related to FIG. 2A)

According to examples of the present disclosure, local L2/L3 packets between VFs may be steered towards processing pipeline 210, or more particular a packet queue supported by PNIC 124A. Examples of the present disclosure may be implemented to alleviate obstacle(s) relating to conventional approaches. Some example obstacles are discussed below:

(1) Local logical L2 network packets: For a first scenario where VM0 130 and VM1 131 are attached to the same logical switch, L2 packets between VFs 201-202 connected to the same logical network on the same host-A 110A may be dispatched by hardware embedded switch 203 directly. This is because hardware embedded switch 203 is generally not a learning switch and it is necessary to program a destination VF's MAC address on PNIC 124A. However, this might be problematic because packets may be dispatched directly to the destination VF without additional processing, such as updating metric information (e.g., count), packet header information (e.g., differentiated services code point (DSCP) value), firewalling to allow or block packets from VF0 201 to VF1 202, etc.

(2) Local logical L3 network packets: For a second scenario where VM0 130 and VM1 131 are connected via a logical router, L3 packets from VF0 201 to destination VF1 202 may be dispatched to PHY 204 directly. This is because MAC address=MAC-VDR associated with the logical router might not be visible to PNIC 124A.

According to examples of the present disclosure, local L2 packets from VF0 201 to VF1 202 may be tagged with "VLAN0" and considered to be packets between different VLANs (i.e., VLAN0 and VLAN1). In this case, hardware embedded switch 203 may steer them towards processing pipeline 210 based on FILTER1 (see 511 in FIG. 5) instead of dispatching the packets directly to VF1 202. For local L3 packets from VF0 201 to MAC-VDR, the packets may be tagged with "VLAN0." In this case, hardware embedded switch 203 may steer them towards a packet queue on processing pipeline 210 based on FILTER2 (see 512 in FIG. 5) instead of dispatching the packets directly to VF1 202.

Figure 6:
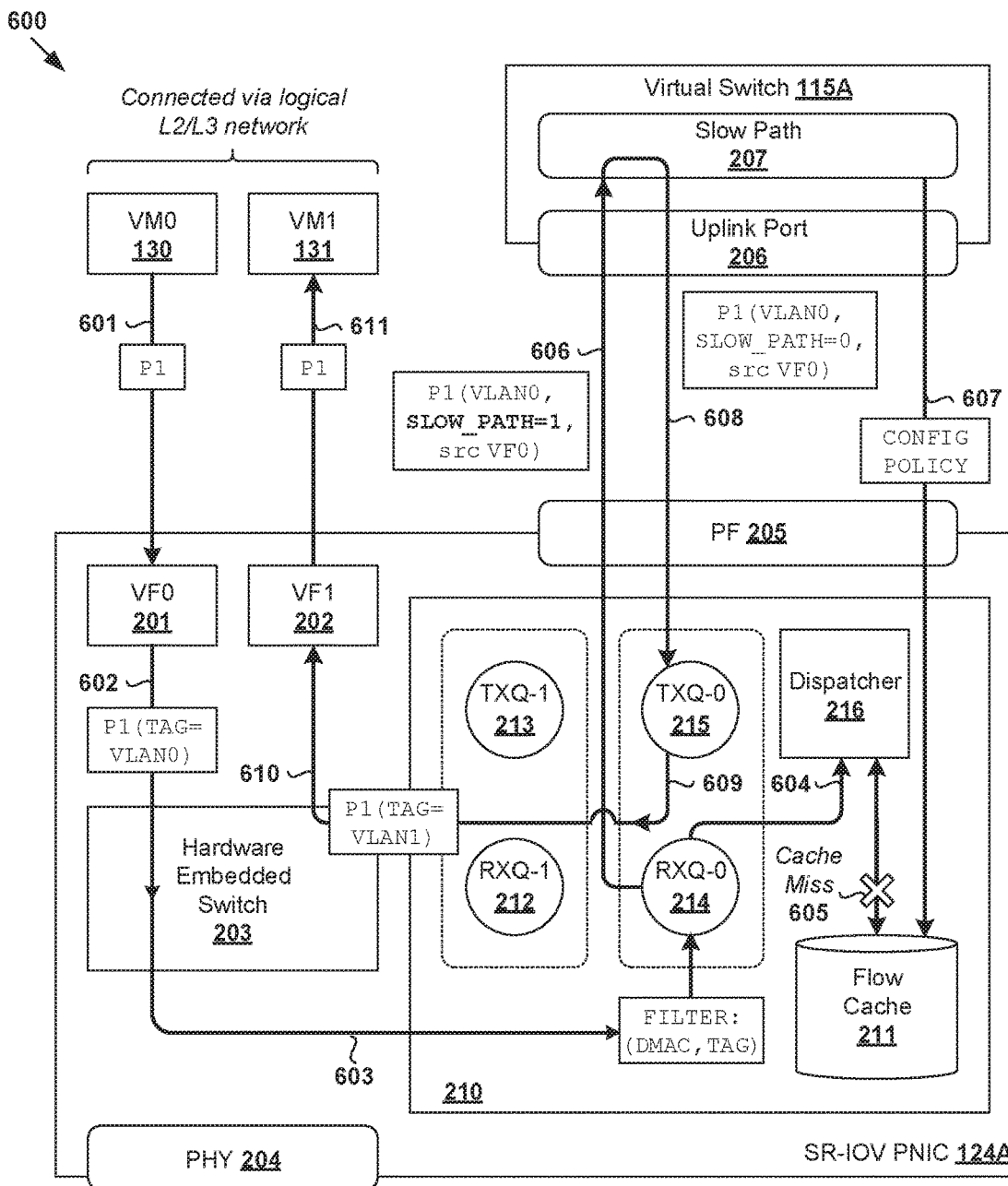
FIG. 6 is a schematic diagram illustrating a first example of logical network packet handling on a PNIC using a slow path.
Figure 7:
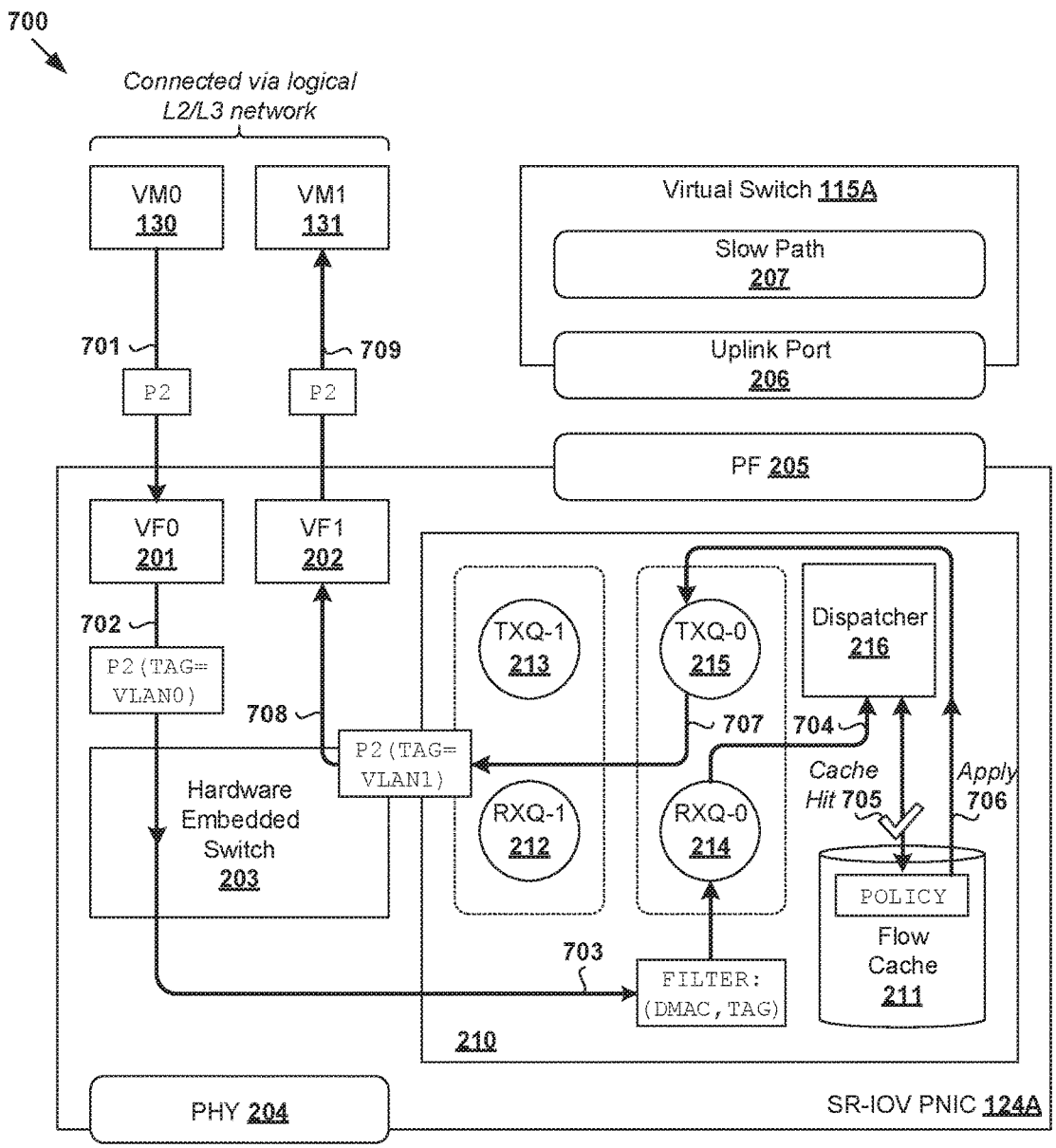
FIG. 7 is a schematic diagram illustrating a first example of logical network packet handling on a PNIC using a fast path.

In the following, some examples will be discussed using FIG. 6 and FIG. 7. In particular, FIG. 6 is a schematic diagram illustrating first example 600 of logical network packet handling on a PNIC using a slow path. FIG. 7 is a schematic diagram illustrating a first example of logical network packet handling on a PNIC using a fast path. Using the example in FIG. 6, a first packet of a flow may be processed using a slow path (see 207) implemented by virtual switch 115A. Subsequent packets of the same flow may be processed using a fast path implemented by PNIC 124A. Tuple information will be denoted as follows: SMAC=source MAC address, DMAC=destination MAC address, SIP=source IP address and DIP=destination IP address.

(a) Slow Path (See FIG. 6)

At 601 in FIG. 6, VM0 130 may generate and send packet "P1" towards VF0 201 of PNIC 124A. In this example, VM0 130 and VM1 131 are located on a logical L2 network. Packet "P1" may be a unicast packet specifying MAC address information=(SMAC=MAC-VF0, DMAC=MAC-VF1), where SMAC=source MAC address associated with VF0 201 and DMAC is associated with destination VF1 202. In practice, the unicast packet may be in the form of an ICMP packet. Alternatively (not shown in FIG. 6), packet 620 may be a broadcast packet or multicast packet. See blocks 410-415 in FIG. 4.

At 602 in FIG. 6, in response to detecting packet "P1" via VF0 201, PNIC 124A may attach the packet with tag=VLAN0 configured for VF0 201 (see 510 in FIG. 5). Depending on the desired implementation, tag=VLAN0 may be attached before the packet reaches hardware embedded switch 203. See block 420 in FIG. 4.

At 603 in FIG. 6, hardware embedded switch 203 may inspect "P1" with tag=VLAN0 and apply FILTER1 specifying (DMAC=MAC-VF1, TAG=VLAN0) to steer towards processing pipeline 210. In particular, the packet may be steered towards RX queue "RXQ-0" 214 assigned to source VF0 201. Here, packet "P1" may be considered to have an unknown DMAC=MAC-VF1 in VLAN0 and is therefore assigned to "RXQ-0" 214. See FILTER1 in FIG. 5 and block 425 in FIG. 4.

At 604-605 in FIG. 6, dispatcher 216 of processing pipeline 210 may attempt to retrieve a policy that is applicable to packet "P1," such as by performing a lookup in flow cache 211 of PNIC 124A based on the content of the packet. Since packet "P1" may be the first of the flow, a cache miss event will be detected. See blocks 430-435 in FIG. 4.

At 606 in FIG. 6, in response to detecting a cache miss event, dispatcher 216 may steer packet "P1" towards virtual switch 115A for slow path processing (see 207). Dispatcher 216 may also set FLAG=SLOW_PATH and source VF=VF0 in packet "P1" before forwarding it towards virtual switch 115A via PF 205 and uplink port 206. In practice, slow path processing at virtual switch 115A may involve any suitable software components (not shown in FIG. 6 for simplicity), such as logical core(s) for polling packets from "RXQ-0" 214, VF representor ports, I/O chain filter for policy programming, etc. See blocks 440-445 in FIG. 4.

At 607 in FIG. 6, virtual switch 115A may instruct PNIC 124A to configure or program a logical network policy (see POLICY1 621) in flow cache 211 (i.e., logical network policy datastore). This way, POLICY1 621 may be applied to subsequent packets of the same flow. In the case of unicast transmission, POLICY1 621 may specify any suitable match fields, such as (SMAC=MAC-VF0, DMAC=MAC-VF1) associated with VF0 201 and VF1 202. This has the effect of learning DMAC=MAC-VF1. In the event of a match, POLICY1 621 may specify an action to output or forward the packet towards VF1 202. See blocks 455-460 in FIG. 4.

At 608 in FIG. 6, after processing packet "P1" according to POLICY1 621, virtual switch 115A may steer the packet towards VF1 202 by injecting the packet into TX queue "TXQ-0" 215. See block 465 in FIG. 4.

At 609-611 in FIG. 6, PNIC 124A may retrieve packet "P1" from "TXQ-0" 215 before steering the packet towards VM1 131 via VF1 202. This may involve dispatcher 216 updating the VLAN ID tag in the packet from "VLAN0" to "VLAN1" associated with VF1 202. Based on tag=VLAN1, embedded switch 203 may steer the processed packet "P1" towards VM1 131 via VF1 202. In the case of a broadcast packet, dispatcher 216 may convert the packet to a unicast packet with destination MAC address=MAC-VF1. See 470 in FIG. 4.

(b) Fast Path (See FIG. 7)

For subsequent packets from VM0 130 to VM1 131, PNIC 124A may process the packets using a fast path based on POLICY1 621 without steering the packets towards virtual switch 115A. Referring now to FIG. 7, at 701, VM0 130 may generate and send a subsequent packet "P2" towards VF0 201 of PNIC 124A. Here, packet "P2" may be a unicast packet specifying (SMAC=MAC-VF0, DMAC=MAC-VF1) associated with respective source VF0 201 and destination VF1 202.

Next, at 702-703 in FIG. 7, packet "P2" may be tagged with "VLAN0" configured for VF0 201 and steered towards "RXQ-0" 214 based on FILTER1 specifying (DMAC=MAC-VF1, VLAN0). At 704-705, based on the content of packet "P2," dispatcher 216 may perform a lookup to retrieve POLICY1 (see 621) configured for the packet flow. Since there is a flow hit event, corresponding action=steer towards VF1 202 may be performed.

At 706-707, dispatcher 216 may apply POLICY1 (see 621) before steering packet "P1" towards VF1 202. This may involve tagging packet "P1" with "VLAN1" assigned to VF1 202 before forwarding the packet towards hardware embedded switch 203. At 708-709, hardware embedded switch 203 may steer packet "P2" 660 towards VM1 131 via VF1 202 based on tag="VLAN1." This completes the fast path processing according to blocks 440 (yes), 485-490 and 470 in FIG. 4.

(c) Local Logical L3 Network Packets

The examples in FIG. 6 (slow path) and FIG. 7 (fast path) are also applicable to logical L3 network packet handling, such as from VM0 130 to VM1 131 that are connected via a logical router. In this case, packets "P1" in FIG. 6 and "P2" in FIG. 6 may be addressed from SMAC=MAC-VF0 associated with VF0 201 to DMAC=MAC-VDR associated with the logical router. To steer the packets towards processing pipeline 210, FILTER2 (see 512 in FIG. 5) may be applied based on tag="VLAN0" associated with VF0 201 and DMAC=MAC-VDR specified by the packets.

A first packet "P1" of the flow may be forwarded towards virtual switch 115A to trigger the configuration of POLICY2 (see 622 in FIG. 6 and FIG. 7) for the logical L3 network packet flow. POLICY2 622 may specify match fields identifying (SMAC=MAC-VF0, DMAC=MAC-VDR, SIP=IP-VF0, DIP=IP-VF1), where IP-VF0 and IP-VF1 are IP addresses associated with respective VF0 201 and VF1 202. In the event of a match, the following actions may be performed: updating SMAC to MAC-VDR, updating DMAC to MAC-VF1, decrementing a time-to-live (TTL) value and forwarding the packet towards VF1 202.

Using the example in FIG. 7, subsequent packets "P2" of the same flow from VM0 130 to VM1 131 may be processed using a fast path implemented by PNIC 124A, Similarly, POLICY2 622 may be retrieved from flow cache 211 and applied without requiring additional processing by virtual switch 115A.

Remote L2/L3 Traffic (See FIG. 2B)

According to examples of the present disclosure, remote L2/L3 packets between VFs may be steered towards processing pipeline 210, or more particular a packet queue supported by PNIC 124A. Examples of the present disclosure may be implemented to alleviate obstacle(s) relating to conventional approaches. Some example obstacles are discussed below:

(1) Remote logical L2 network traffic: For a first scenario where VM0 130 and remote VM3 133 (e.g., MAC-X) are attached to the same logical switch, the remote destination MAC address may be considered to be an unknown address on PNIC 124A. In this case, packets addressed to the remote destination MAC address will be dispatched to PHY 204 without any encapsulation.

(2) Remote logical L3 network traffic: For a second scenario where VM0 130 and remote VM3 133 are connected via a logical router, a destination MAC address associated with a logical router (e.g., MAC-VDR) may be considered to be an unknown address on PNIC 124A. Similar to the third scenario, packets addressed to the remote destination MAC address will be dispatched to PHY 204 without any encapsulation.

According to examples of the present disclosure, remote L2 packets from VF0 201 to a remote VIF associated with destination VM3 133 may be tagged with "VLAN0". Based on FILTER3 (see 513 in FIG. 5), hardware embedded switch 203 may steer the L2 packets towards processing pipeline 210 instead of dispatching them directly to PHY 204. For remote L3 packets, hardware embedded switch 203 may steer them towards processing pipeline 210 based on FILTER2 (see 512 in FIG. 5) instead of dispatching the packets directly to dispatching them directly to PHY 204.

In the following, some examples will be discussed using FIGS. 8-9. In more detail, FIG. 8 is a schematic diagram illustrating second example 800 of logical network packet handling on a PNIC using a slow path, and FIG. 9 is a schematic diagram illustrating second example 900 of logical network packet handling on a PNIC using a fast path. Using the example in FIG. 8, a first packet of a flow may be processed using a slow path (see 207) implemented by virtual switch 115A. Subsequent packets of the same flow may be processed using a fast path implemented by PNIC 124A.

Figure 8:
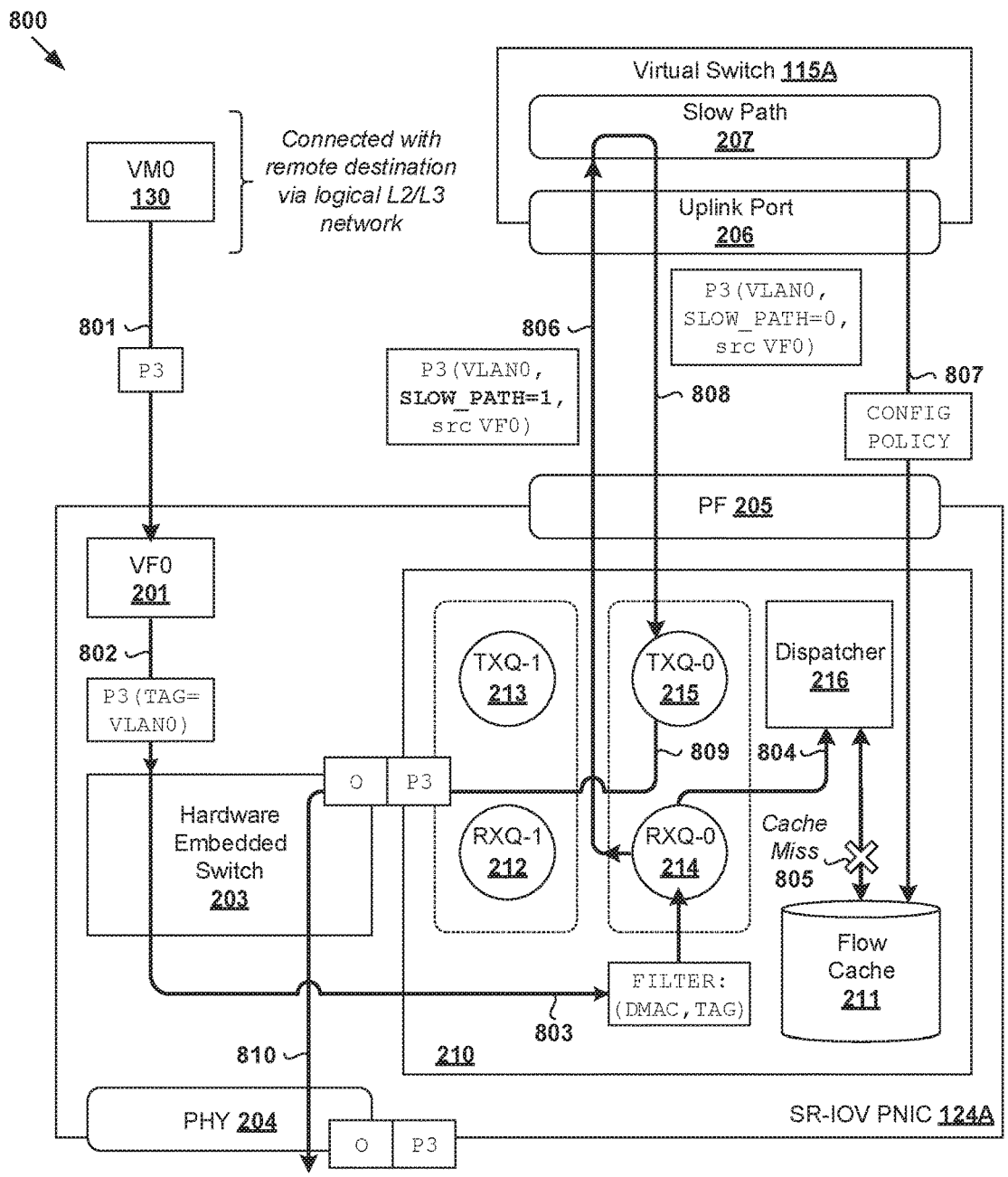
FIG. 8 is a schematic diagram illustrating a second example of remote logical network packet handling on a PNIC using a slow path.

(a) Slow Path (See FIG. 8)

At 801 in FIG. 8, VM0 130 may generate and send packet "P3" towards VF0 201 of PNIC 124A. In this example, VM0 130 and VM3 133 are located on the same logical L2 network. Packet "P3" may be a unicast packet specifying MAC address information=(SMAC=MAC-VF0, DMAC=MAC-X), where SMAC=source MAC address associated with VF0 201 and DMAC is associated with a remote virtual interface (VIF) to which destination VM3 133 is connected. See 410-415 in FIG. 4.

At 802 in FIG. 8, in response to detecting packet "P3" via VF0 201, PNIC 124A may attach the packet with tag=VLAN0 configured for VF0 201 (see 510 in FIG. 5). Depending on the desired implementation, tag=VLAN0 may be attached before the packet reaches hardware embedded switch 203. See block 420 in FIG. 4.

At 803 in FIG. 8, hardware embedded switch 203 may inspect "P3" with tag=VLAN0 and apply FILTER3 specifying (DMAC=MAC-X, TAG=VLAN0) to steer towards processing pipeline 210. In particular, the packet may be steered towards RX queue "RXQ-0" 214 assigned to source VF0 201. Similarly, packet "P3" may be considered to have an unknown DMAC=MAC-X in VLAN0 and is therefore assigned to "RXQ-0" 214. See FILTER3 at 513 in FIG. 5 and block 425 in FIG. 4.

At 804-805 in FIG. 8, dispatcher 216 of processing pipeline 210 may attempt to retrieve a policy that is applicable to packet "P3," such as by performing a lookup in flow cache 211 based on SMAC=MAC-VF0 and DMAC=MAC-X of the packet. Since packet "P3" may be the first of the flow, a cache miss event will be detected. See blocks 430-435 in FIG. 4.

At 806 in FIG. 8, in response to detecting a cache miss event, dispatcher 216 may steer packet "P3" towards virtual switch 115A for slow path processing (see 207). Dispatcher 216 may also set FLAG=SLOW_PATH and source VF=VF0 in packet "P3" before forwarding it towards virtual switch 115A. Similar to the example in FIGS. 6-7, slow path processing at virtual switch 115A may involve any suitable software components (not shown), such as logical core(s) for polling packets from "RXQ-0" 214, VF representor ports, etc. See blocks 440-445 in FIG. 4.

At 807 in FIG. 8, virtual switch 115A may instruct PNIC 124A to configure and store logical network policy (see "POLICY3" 821) in flow cache 211 (i.e., logical network policy datastore). POLICY3 821 is applicable to subsequent packets of the same flow. In the case of unicast transmission, POLICY3 821 may specify any suitable match fields, such as (SMAC=MAC-VF0, DMAC=MAC-X) associated with respective VF0 201 and VM3 133. This has the effect of learning DMAC=MAC-X. In the event of a match, action(s) specified by POLICY3 821 may be performed. See blocks 455-460 in FIG. 4.

At 808 in FIG. 8, virtual switch 115A may process packet "P3" according to POLICY3 821, such as by encapsulating the packet with an outer header (O). For example, the outer header may specify (SMAC(O)=MAC-LOCAL-VTEP, DMAC(O)=MAC-REMOTE-VTEP or MAC-ROUTER), where "O" indicates an outer header field, MAC-LOCAL-VTEP is a MAC address of a source VTEP on host-A 110A, MAC-REMOTE-VTEP is a MAC address of a destination VTEP on host-B 110B and MAC-ROUTER is a MAC address of an intermediate router connecting host-A 110A and host-B 110B. The outer header may further specify (SIP(O)=IP-LOCAL-VTEP, DIP(O)=IP-REMOTE-VTEP), where SIP=source IP address associated with the source VTEP and DIP=destination IP address associated with the destination VTEP.

At 809-810 in FIG. 8, PNIC 124A may retrieve encapsulated packet (O, P3) from "TXQ-0" 215 before steering the encapsulated packet towards VM3 133 via PHY 204. See also 470 in FIG. 4.

Figure 9:
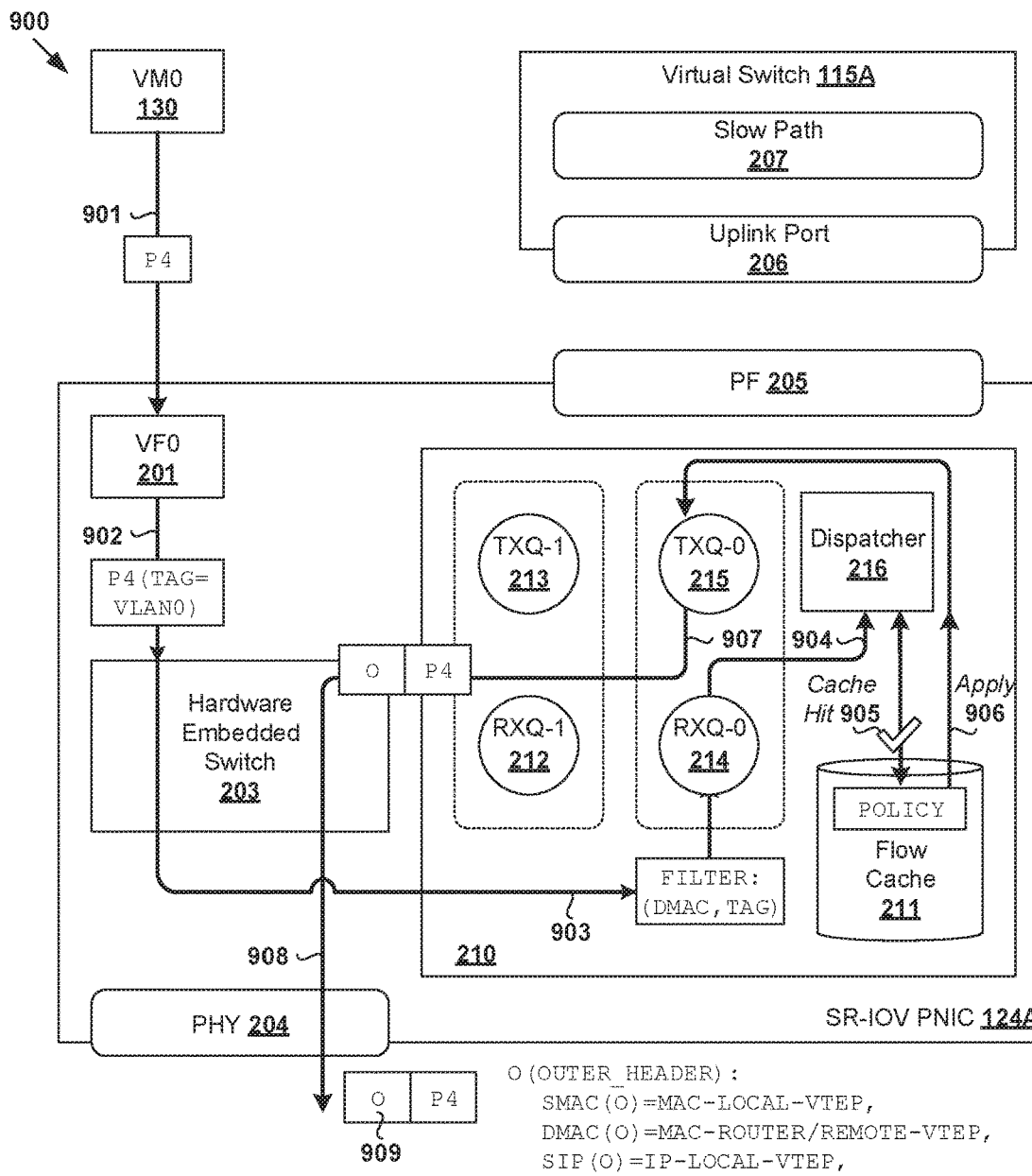
FIG. 9 is a schematic diagram illustrating a second example of remote logical network packet handling on a PNIC using a fast path.

(b) Fast Path (See FIG. 9)

For subsequent packets from VM0 130 to VM3 133, PNIC 124A may process the packets using a fast path based on POLICY3 821 without steering the packets towards virtual switch 115A. Referring now to FIG. 9, at 901, VM0 130 may generate and send a subsequent packet "P4" towards VF0 201 of PNIC 124A. Here, packet "P4" may be a unicast packet specifying (SMAC=MAC-VF0, DMAC=MAC-X) associated with respective source VF0 201 and destination VM3 133.

Next, at 902-903 in FIG. 9, packet "P4" may be tagged with "VLAN0" configured for VF0 201 and steered towards "RXQ-0" 214 based on FILTER3 specifying (DMAC=MAC-X, VLAN0). At 904-905, based on the content of packet "P4," dispatcher 216 may perform a lookup to retrieve POLICY3 (see 821). Since there is a flow hit event, corresponding actions specified by POLICY3 821 may be performed.

At 906-907 in FIG. 9, dispatcher 216 may apply POLICY3 (see 821) before steering encapsulated packet (O, P4) towards hardware embedded switch 203. This may involve encapsulating the packet with an outer header (0) specifying (SMAC=MAC-LOCAL-VTEP, DMAC=MAC-REMOTE-VTEP or MAC-ROUTER. SIP=IP-LOCAL-VTEP, DIP=IP-REMOTE-VTEP); see also 909 in FIG. 9.

At 908 in FIG. 9, hardware embedded switch 203 may steer encapsulated packet (O, P4) towards VM3 133 via PHY 204. This completes the fast path processing according to blocks 440 (yes), 485-490 and 470 in FIG. 4.

(c) Remote Logical L3 Network Packets

The examples in FIG. 8 (slow path) and FIG. 9 (fast path) are also applicable to logical L3 network packet handling, such as from VM0 130 to VM3 133 that are connected via a logical router. In this case, packets "P3" in FIG. 8 and "P4" in FIG. 8 may be addressed from SMAC=MAC-VF0 associated with VF0 201 to DMAC=MAC-VDR of a remote VIF associated with VM3 133. To steer the packets towards processing pipeline 210, FILTER2 (see 512 in FIG. 5) may be applied based on tag="VLAN0" associated with VF0 201 and DMAC=MAC-VDR specified by the packets.

A first packet "P3" of the flow may be forwarded towards virtual switch 115A to trigger the configuration of POLICY4 (see 822 in FIG. 8 and FIG. 9) for the logical L3 network packet flow. POLICY4 822 may specify match fields identifying (SMAC=MAC-VF0, DMAC=MAC-VDR, SIP=IP-VF0, DIP=IP-REMOTE-VF), where IP-VF0 is an IP address of source VF0 201 and IP-REMOTE-VF is an IP address of a destination VF (not shown). In the event of a match, the following actions may be performed: updating SMAC to MAC-VDR, updating DMAC to MAC-Y, decrementing a time-to-live (TTL) value, encapsulating with an outer header (0) and forwarding towards PHY 204.

In this case, the outer header may specify (SMAC(O) =MAC-LOCAL-VTEP, DMAC(O)=MAC-REMOTE-VTEP or MAC-ROUTER), where MAC-LOCAL-VTEP is a MAC address of a source VTEP on host-A 110A, MAC-REMOTE-VTEP is a MAC address of a destination VTEP on host-B 110B and MAC-ROUTER is a MAC address of an intermediate router connecting host-A 110A and host-B 110B. The outer header may further specify (SIP(O)=IP-LOCAL-VTEP, DIP(O)=IP-REMOTE-VTEP), where SIP=source IP address associated with the source VTEP and DIP=destination IP address associated with the destination VTEP. See 909 in FIG. 9.

Using the example in FIG. 9, subsequent packets "P4" of the same flow from VM0 130 to VM3 333 may be processed using a fast path implemented by PNIC 124A, Similarly, POLICY4 822 may be retrieved from flow cache 211 and applied to generate processed packets (i.e., encapsulated packets) without requiring additional processing by virtual switch 115A.

Ingress Logical Network Traffic Handling

Examples of the present disclosure may be implemented for logical network packets originating from a remote destination, such as VM3 133 on host-B 110B in FIG. 1. Similarly, a first ingress encapsulated packet may be processed using a slow path implemented by virtual switch 115A to trigger configuration of a logical network policy on PNIC 124A. Subsequent packets belonging to the same (ingress) packet flow may be processed using a fast path implemented by PNIC 124A.

Figure 10:
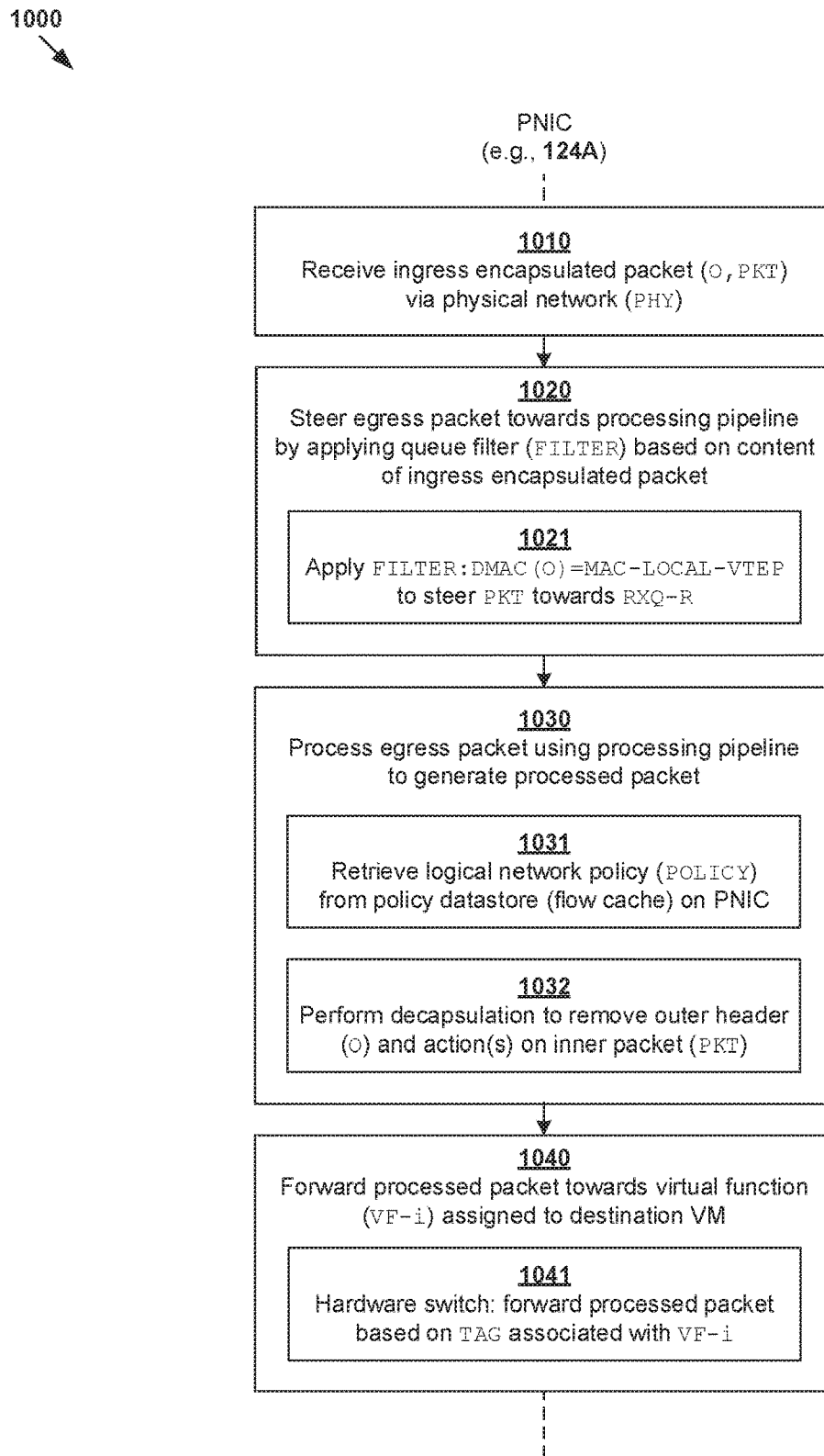
FIG. 10 is a flowchart of an example process for a PNIC to perform logical network packet handling for ingress traffic.

In more detail, FIG. 10 is a flowchart of example process 1000 for PNIC 124A to perform logical network packet handling in SDN environment 100 for ingress traffic. Example process 1000 may include one or more operations, functions, or actions illustrated by one or more blocks, such as 1010 to 1040. The various blocks may be combined into fewer blocks, divided into additional blocks, and/or eliminated depending on the desired implementation. In the following, various examples will be explained using PNIC 124A, VM0 130 as an example "virtualized computing instance," etc.

At 1010 in FIG. 10, PNIC 124A may receive an ingress encapsulated packet associated with a packet flow may be received from a remote source (e.g., VM3 133) to destination=VM0 130 over a logical network. The ingress encapsulated packet may be received via physical network 105 connected to PNIC 124A. The ingress encapsulated packet (also known as remote overlay traffic) may include an outer header (0) and an inner packet. The outer header may be addressed from source=remote VTEP on host-B 110B to destination=local VTEP on host-A 110A. The inner packet may be addressed from source=remote VF associated with VM3 133 to destination=local VF0 201 associated with VM0 130.

At 1020 in FIG. 10, PNIC 124A may steer the ingress encapsulated packet towards processing pipeline 210 supported by PNIC 124A. Block 1020 may involve applying a filter based on content of the ingress encapsulated packet, such as outer header information in the outer header and/or inner header information in the inner packet. In one example, the filter may specify outer DMAC=destination MAC address associated with a local VTEP on host-A 110A to steer the ingress encapsulated packet towards a dedicated or reserved RX queue on PNIC 124A. In another example (depending on the capability of PNIC 124A), the filter may further specify an outer VNI associated with VF0 201 (e.g., VNI-VF0) and an inner DMAC associated with VF0 201 in addition to the outer DMAC in the outer header. See also 1021.

At 1030 in FIG. 10, PNIC 124A may process the ingress encapsulated packet using processing pipeline 210 to generate a processed packet. Block 1030 may involve (a) retrieving a logical network policy associated with the packet flow from a datastore on the PNIC and (b) performing decapsulation to remove the outer header and action(s) on the inner packet according to the logical network policy, thereby generating the processed packet. See 1031-1032. Depending on the logical network policy, the processed packet may have the same content as the inner packet in the ingress encapsulated packet, or different content. Action(s) specified by the logical network policy and performed on the inner packet may relate to switching, routing, encapsulation, decapsulation, firewall, packet inspection, intrusion detection or prevention, load balancing, NAT, INT, IPFIX functionality, mirroring, VPN, any combination thereof, etc.

At 1040 in FIG. 10, PNIC 124A may forward the processed packet towards destination=VM0 130 via virtual function=VF0 201 supported by PNIC 124A. This way, instead of dispatching the ingress encapsulated packet directly to the destination once it is received, the logical network policy may be applied. Depending on the desired implementation, the processed packet may be tagged with VLAN ID=VLAN0 associated with VF0 201 to facilitate packet forwarding by hardware embedded switch 203 towards VF0 201. The processed packet is directly sent from hardware embedded switch 203 towards VM0 130 via VF0 201 based on the tag, thereby bypassing virtual switch 115A. See 1041.

Figure 11:
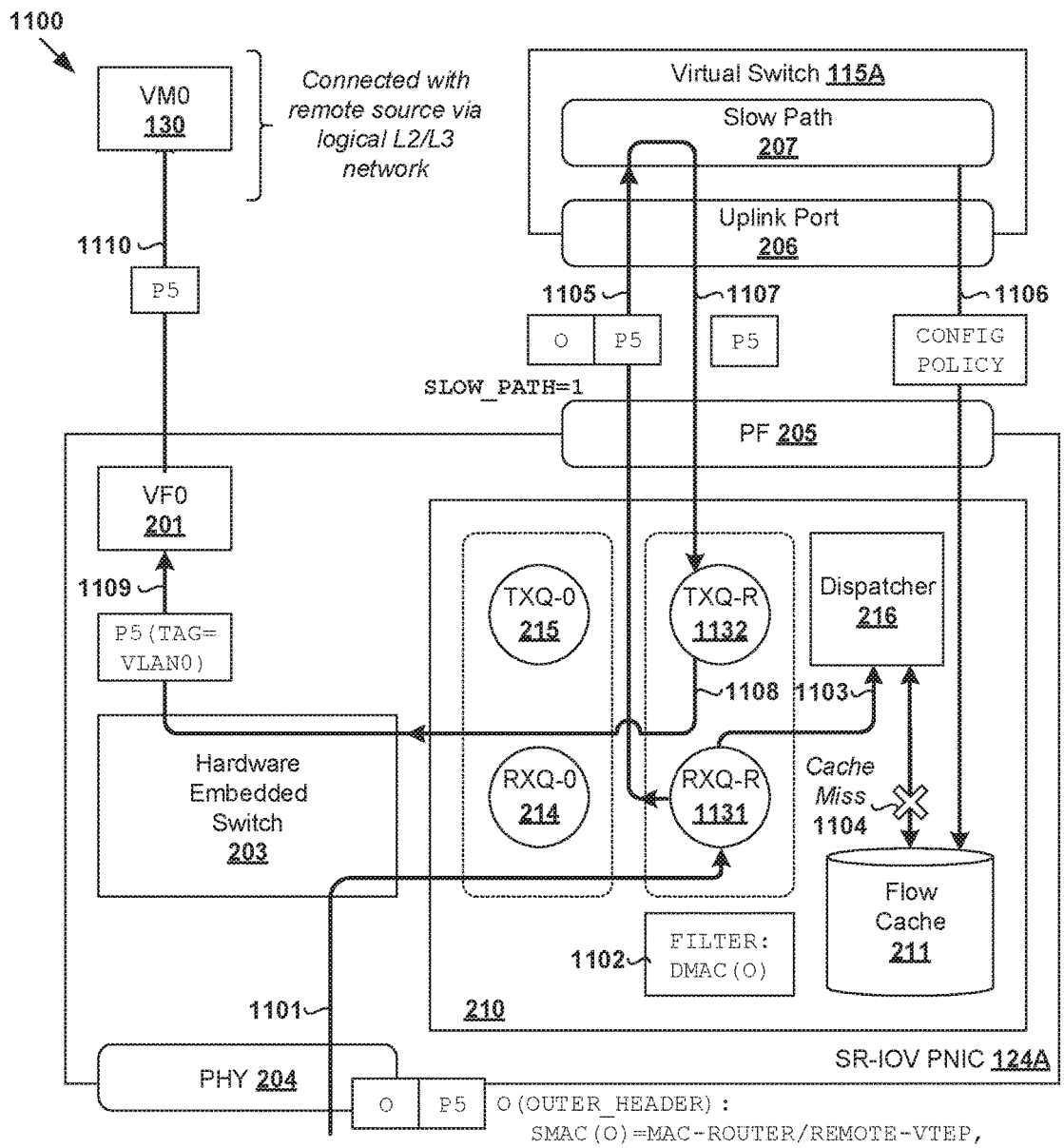
FIG. 11 is a schematic diagram illustrating a third example of logical network packet handling on a PNIC using a slow path for ingress traffic.
Figure 12:
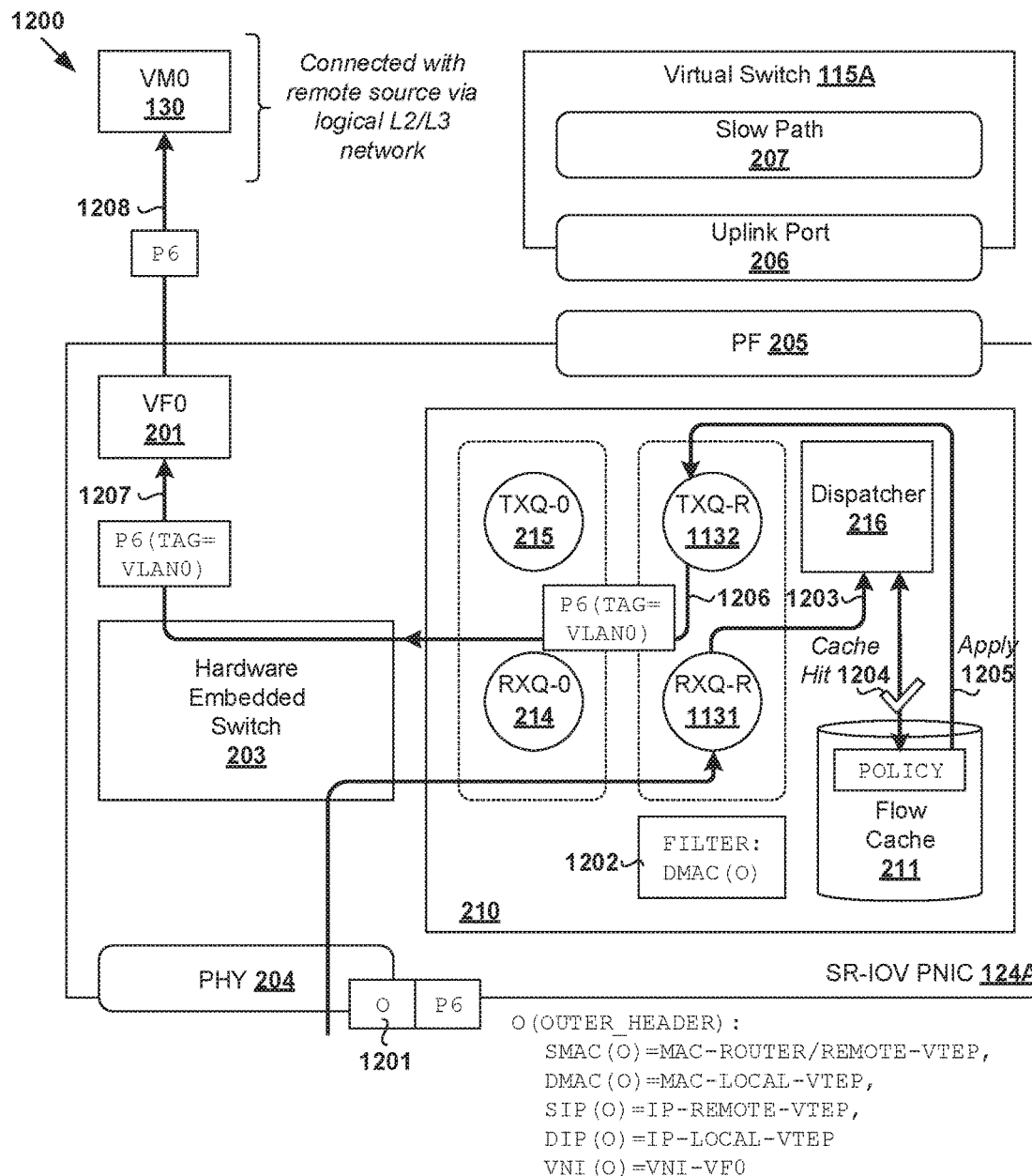
FIG. 12 is a schematic diagram illustrating a third example of logical network packet handling on a PNIC using a fast path for ingress traffic.

In the following, some examples will be discussed using FIGS. 11-12. In more detail, FIG. 11 is a schematic diagram illustrating example 1100 of logical network packet handling on a PNIC using a slow path for ingress traffic, and FIG. 12 is a schematic diagram illustrating example 1200 of logical network packet handling on a PNIC using a fast path for ingress traffic. Using the example in FIG. 11, a first ingress encapsulated packet of a flow may be processed using a slow path (see 207) implemented by virtual switch 115A. Subsequent ingress encapsulated packets of the same flow may be processed using a fast path implemented by PNIC 124A.

To facilitate ingress traffic handling, filter(s) may be configured or programmed on PNIC 124A to steer traffic towards a reserved RX queue on processing pipeline 210. In the examples in FIGS. 11-12, the reserved RX queue is denoted as "RXQ-R" 1131 and paired with a reserved TX queue denoted as "TXQ-R" 1132 ("R" indicating reserved). In this case, FILTER7 specifying DMAC(O)=MAC-LOCAL-VTEP assigned to a local VTEP on host-A 110A.

(a) Slow Path (See FIG. 11)

At 1101 in FIG. 11, PNIC 124A may receive an ingress encapsulated packet from physical network 205 via physical interface 204. In this example, the ingress encapsulated packet may include an outer header (O) and an inner packet (P5). The inner packet may specify MAC address information (SMAC=MAC-X, DMAC=MAC-VF0). Here, SMAC=MAC-X may be a source MAC address associated with a remote VIF to which remote source VM3 133 is connected. DMAC=MAC-VF0 may be a destination MAC address associated with VF0 201. In this example, local destination=VM0 130 and remote source=VM3 133 are located on the same logical L2 network.

The outer header may specify ("O" indicating outer): SMAC(O)=MAC-REMOTE-VTEP or MAC-ROUTER and DMAC(O)=MAC-LOCAL-VTEP. Here, MAC-LOCAL-VTEP is a MAC address of a destination (local) VTEP on host-A 110A, MAC-REMOTE-VTEP is a MAC address of a source (remote) VTEP on host-B 110B and MAC-ROUTER is a MAC address of an intermediate router connecting host-A 110A and host-B 110B. The outer header may also specify SIP(O)=IP-REMOTE-VTEP and DIP(O)=IP-LOCAL-VTEP, where SIP=source IP address associated with the source (remote) VTEP and DIP=destination IP address associated with the destination (local) VTEP on host-A 110A. Further, the outer header may specify an outer logical network ID denoted as VNI(O)=VNI-VF0 associated with VF0 201. In practice, the same inner MAC address (e.g., MAC-VF0) may appear in different logical networks, in which case the outer VNI may be used to distinguish them. In other words, MAC address=MAC-VF0 is generally unique within a particular VNI identifiable using VNI-VF0.

At 1102 in FIG. 11, hardware embedded switch 203 may inspect the ingress encapsulated packet (O, P5) and apply FILTER7. This way, the ingress encapsulated packet (O, P5) with the outer header specifying DMAC(O)=MAC-LOCAL-VTEP may be steered towards "RXQ-R" 1131 on processing pipeline 210.

At 1103-1104 in FIG. 11, dispatcher 216 of processing pipeline 210 may attempt to retrieve a policy that is applicable to ingress encapsulated packet (O, P5), such as by performing a lookup in flow cache 211. Since ingress encapsulated packet (O, P5) may be the first of the overlay packet flow, a cache miss event will be detected.

At 1105 in FIG. 11, in response to detecting a cache miss event, dispatcher 216 may steer ingress encapsulated packet (O, P5) towards virtual switch 115A for slow path processing (see 207). Dispatcher 216 may also set FLAG=SLOW_PATH before forwarding it towards virtual switch 115A. Similar to the example in FIGS. 6-7, slow path processing at virtual switch 115A may involve any suitable software components (not shown), such as logical core(s) for polling packets from "RXQ-R" 1131, VF representor ports, etc.

At 1106 in FIG. 11, virtual switch 115A may instruct PNIC 124A to configure and store logical network policy (see "POLICY5" 1121) in flow cache 211. POLICY5 1121 is applicable to subsequent packets of the same flow. In the case of unicast transmission, POLICY5 1121 may specify any suitable match fields, such as (SMAC=MAC-X, DMAC=MAC-VF0, VNI(O)=VNI-VF0) associated with respective source VM3 133 and destination VF0 201. This also has the effect of learning DMAC=MAC-X configured within a logical network identifiable using VNI-VF0. In the event of a match, action(s) specified by POLICY5 1121 may be performed.

At 1107 in FIG. 11, virtual switch 115A may process ingress encapsulated packet (O, P5) according to POLICY5 1121. Any suitable action(s) may also be performed, such as decapsulation to remove the outer header (O), applying a firewall rule, tagging inner packet (P5) with TAG=VLAN0 configured for VF0 201, etc. The processed packet is then steered towards "TXQ-R" 1132.

At 1108-1110 in FIG. 11, hardware embedded switch 203 may retrieve the processed packet tag=VLAN0 from "TXQ-R" 1132 and steer it towards destination VM0 130 via VF0 201.

(b) Fast Path (See FIG. 12)

For subsequent packets from VM3 133 to VM0 130, PNIC 124A may perform packet processing using a fast path based on POLICY5 1121, i.e., without steering the packets towards virtual switch 115A. Referring now to FIG. 12, at 1201, PNIC 124A may receive a subsequent ingress encapsulated packet (O, P6) via physical interface 204. Similarly. the outer header may specify SMAC(O)=MAC-REMOTE-VTEP or MAC-ROUTER, DMAC(O)=MAC-LOCAL-VTEP, SIP(O)=IP-REMOTE-VTEP, DIP(O)=IP-LOCAL-VTEP and VNI(O)=VNI-VF0. The inner packet (P6) may specify (SMAC=MAC-X, DMAC=MAC-VF0) associated with respective source VM3 133 and destination VM0 130.

Next, at 1202 in FIG. 12, hardware embedded switch 203 may steer the ingress encapsulated packet (O, P6) towards "RXQ-R" 1131 based on FILTER7 specifying DMAC=MAC-LOCAL-VTEP. At 1203-1204, based on the content of the ingress encapsulated packet (O, P6), dispatcher 216 may perform a lookup to retrieve POLICY5 (see 1121). Since there is a flow hit event, corresponding actions specified by POLICY5 1121 may be performed.

At 1205 in FIG. 12, dispatcher 216 may apply POLICY5 (see 1121) to perform various actions, such as decapsulation to remove the outer header and tagging to attach TAG=VLAN0 to inner packet (P6). At 1206-1208, hardware embedded switch 203 may retrieve the processed inner packet (P6) from "TXQ-R" 1132 and steer it towards VM0 130 via VF0 201 based on TAG=VLAN0.

(c) Remote Logical L3 Network Packets

The examples in FIG. 11 (slow path) and FIG. 12 (fast path) are also applicable to logical L3 network packet handling, such as from VM3 133 to VM0 130 that are deployed on different logical L2 networks and connected via a logical router. In this case, inner packets "P5" in FIG. 11 and "P6" in FIG. 12 may be addressed from inner SMAC=MAC-VDR of a remote VIF associated with VM3 133 to inner DMAC=MAC-VF0 associated with VF0 201. The outer header may specify ("O" indicating outer header information): SMAC(O)=MAC-REMOTE-VTEP or MAC-ROUTER, DMAC(O)=MAC-LOCAL-VTEP, SIP(O)=IP-REMOTE-VTEP, DIP(O)=IP-LOCAL-VTEP and VNI(O)=VNI-VF0.

A first ingress encapsulated packet (O, P5) of the packet flow may be steered towards "RXQ-R" 1131 of processing pipeline 210 based on FILTER7 specifying DMAC(O)=MAC-LOCAL-VTEP. The first ingress encapsulated packet (O, P5) is then steered towards virtual switch 115A to trigger the configuration of POLICY6 (see 1122 in FIG. 11 and FIG. 12). POLICY6 1122 may specify any suitable match fields, such as inner SMAC=MAC-VDR in inner packet P5, inner DMAC=MAC-VF0 in inner packet P5 and VNI(O)=VNI-VF0 in the outer header.

In the event of a match, dispatcher 216 may perform various actions according to POLICY6 1122, such as decapsulation to remove the outer header, tagging with TAG=VLAN0, etc. Based on TAG=VLAN0, hardware embedded switch 203 may forward the (processed) inner packet towards destination VM0 130 via VF0 201. In practice, VF 201/202 may be configured as a switch VLAN by a PNIC driver. Based on TAG=VLAN0 or TAG=VLAN1, hardware embedded switch 203 may steer a packet towards associated VF0 201 or VF1 202 (similar to an access port configured on a physical switch).

Using the example in FIG. 12, subsequent ingress encapsulated packets (0, P6) of the same ingress packet flow may be processed using a fast path implemented by PNIC 124A. Similarly, POLICY6 1122 may be retrieved from flow cache 211 and applied to generate processed packets (e.g., decapsulated and tagged) without requiring additional processing by virtual switch 115A. Depending on the desired implementation, the handling of PNIC's ingress logical L3 network traffic may be similar to that of ingress logical L2 network traffic. This is because source host-C 110C may be configured to perform logical routing actions, such as updating MAC address information, decrementing the TTL (similar to actions performed by host-A 110A in FIGS. 8-9). In this case, at destination host-A 110A, POLICY6 1122 may be used to match L2 header fields, and perform decapsulation and action(s) accordingly.

Note that POLICY5 1121 and POLICY6 1122 have different match fields for the inner SMAC in the inner packet ("P5" or "P6"). For remote L2 logical network packets, POLICY5 1121 specifies a match field for inner SMAC=MAC-X, which is a MAC address of source VM3 133. For remote L3 logical network packets, POLICY6 1122 specifies a match field for inner SMAC=MAC-VDR, which is the MAC address of a logical router connecting VM0 130 and VM3 133 on different logical L2 segments. As such, if logical routers of different logical networks are using the same MAC address (sometimes a default setting), the same logical network policy may be shared by remote logical L3 traffic originating from same remote VTEP and destined for the same VM. In this case, their outer SMAC (e.g., MAC-REMOTE-VTEP), outer DMAC (e.g., MAC-LOCAL-VTEP), VNI (e.g., VNI-VF0), inner SMAC (e.g., MAC-VDR) and inner DMAC (e.g., MAC-VF0) are generally the same.

Figure 13:
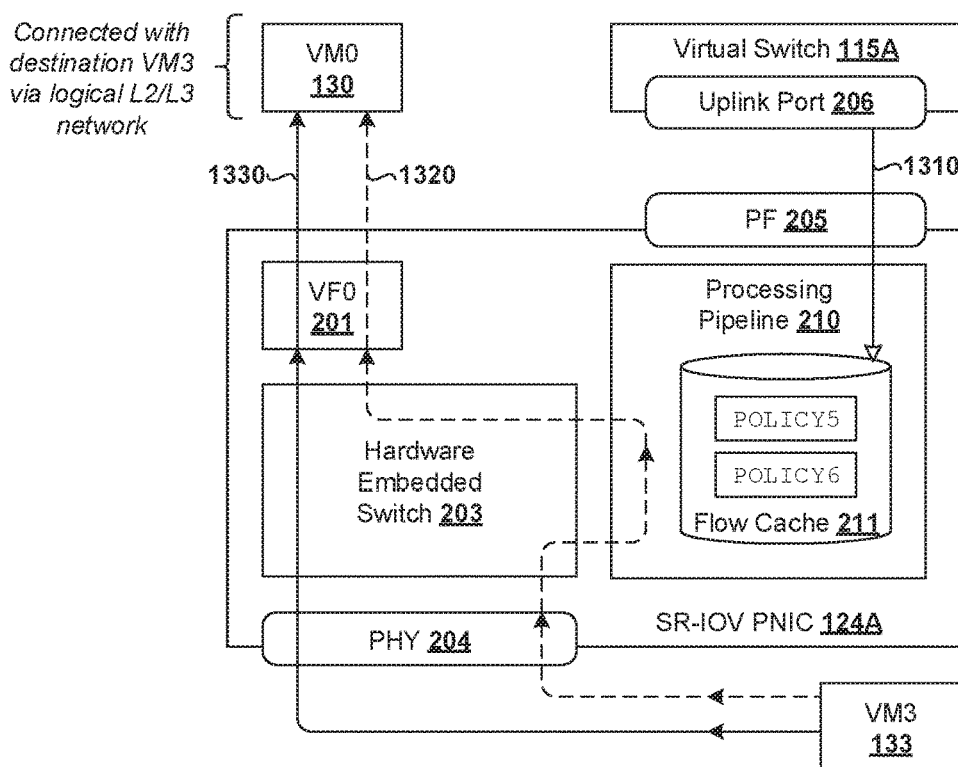
FIG. 13 is a schematic diagram illustrating a third example of logical network packet handling on a PNIC for ingress traffic.

Examples of the present disclosure should be contrasted against conventional approaches that rely on direct dispatching. For example, FIG. 13 is a schematic diagram illustrating third example 1300 of logical network packet handling on a PNIC for ingress traffic. Similar to examples in FIG. 2A (egress traffic to a local destination) and FIG. 2B (egress traffic to a remote destination), examples of the present disclosure may be implemented for ingress traffic from a remote source to a local destination. This way, any suitable logical network policies (see 1310-1320) may be configured and applied at PNIC 124A for L2/L3 logical network packets from VM3 133 to VM0 130. In contrast, conventional direct dispatch approaches (see 1330) generally switch L2/L3 packets received via PHY 204 to VM0 130 without any additional processing (e.g., decapsulation, firewall, etc.). Such conventional direct dispatch approaches are inadequate for logical network traffic handling in SDN environment 100.

Aging and Revalidation

According to examples of the present disclosure, various policies configured for various packet flows may be aged after any suitable duration. For example, if detected to be inactive for a predetermined duration (e.g., 30 seconds) a policy may be aged. Revalidation may be performed by generating a packet and injecting it into a slow path that involves virtual switch 115A. A flag in the packet may be set to indicate a revalidation packet. For example, if a new policy is configured, the new policy may be compared to an older policy. If no new policy is configured, invalidation may be performed.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 13, container technologies may be used to run various containers inside respective VMs 130-133. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 13.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a physical network interface controller (PNIC) to perform logical network packet handling, the PNIC being enabled with Input/Output (I/O) virtualization to support multiple virtual functions, wherein the method comprises:
    assigning a packet queue in a processing pipeline supported by the PNIC to a first virtual function, wherein the first virtual function is supported by the PNIC and assigned to a virtualized computing instance, and the processing pipeline is a component external to the first virtual function or a second virtual function of the virtual functions;
    prior to detecting an egress packet, configuring a logical network policy for a packet flow based on an instruction from a virtual switch associated with the virtualized computing instance;
    receiving the egress packet associated with the packet flow from the virtualized computing instance to a destination over a logical network, wherein the egress packet is received via the first virtual function;
    steering the egress packet towards the packet queue in the processing pipeline by applying a filter associated with the first virtual function or content of the egress packet, or both;
    processing the egress packet using the processing pipeline to generate a processed packet, wherein processing the egress packet includes (a) retrieving the logical network policy associated with the packet flow from a datastore on the PNIC and (b) performing one or more actions according to the logical network policy; and
    forwarding the processed packet towards the destination via the second virtual function supported by the PNIC or a physical network connected to the PNIC.

2. The method of claim 1, wherein steering the egress packet towards the processing pipeline comprises:
    identifying a logical network tag assigned to the first virtual function via which the egress packet is received; and
    based on the logical network tag and a destination address specified by the egress packet, applying the filter to steer the egress packet towards the packet queue supported by the PNIC.

3. The method of claim 1, wherein steering the egress packet towards the processing pipeline comprises:
    attaching, to the egress packet, the tag that identifies a virtual local area network (VLAN) or virtual network identifier (VNI) associated with the first virtual function.

4. The method of claim 1, wherein the method comprises:
    triggering the virtual switch to configure the logical network policy by forwarding a prior egress packet belonging to the packet flow towards the virtual switch.

5. The method of claim 1, wherein processing the egress packet comprises:
    generating the processed packet by updating source media access control (MAC) address information or destination MAC address information in the egress packet for forwarding to the destination over a logical layer-3 network.

6. The method of claim 1, wherein processing the egress packet comprises:
    generating the processed packet by encapsulating the egress packet with an outer header that is addressed from a first virtual tunnel endpoint (VTEP) associated with the virtualized computing instance to a second VTEP associated with the destination for forwarding to the destination via a physical network.

7. A non-transitory computer-readable storage medium that includes a set of instructions which, in response to execution by a processor of a physical network interface controller (PNIC) enabled with Input/Output (I/O) virtualization, cause the processor to perform a method associated with logical network packet handling, wherein the method comprises:

assigning a packet queue in a processing pipeline supported by the PNIC to a first virtual function, wherein the first virtual function is supported by the PNIC and assigned to a virtualized computing instance, and the processing pipeline is a component external to the first virtual function or a second virtual function of the virtual functions;

prior to detecting an egress packet, configuring a logical network policy for a packet flow based on an instruction from a virtual switch associated with the virtualized computing instance;

receiving the egress packet associated with the packet flow from the virtualized computing instance to a destination over a logical network, wherein the egress packet is received via the first virtual function;

steering the egress packet towards the packet queue in the processing pipeline by applying a filter associated with the first virtual function or content of the egress packet, or both;

processing the egress packet using the processing pipeline to generate a processed packet, wherein processing the egress packet includes (a) retrieving the logical network policy associated with the packet flow from a datastore on the PNIC and (b) performing one or more actions according to the logical network policy; and forwarding the processed packet towards the destination via the second virtual function supported by the PNIC or a physical network connected to the PNIC.

8. The non-transitory computer-readable storage medium of claim 7, wherein steering the egress packet towards the processing pipeline comprises:

identifying a logical network tag assigned to the first virtual function via which the egress packet is received; and based on the logical network tag and a destination address specified by the egress packet, applying the filter to steer the egress packet towards the packet queue supported by the PNIC.

9. The non-transitory computer-readable storage medium of claim 7, wherein steering the egress packet towards the processing pipeline comprises:

attaching, to the egress packet, the tag that identifies a virtual local area network (VLAN) or virtual network identifier (VNI) associated with the first virtual function.

10. The non-transitory computer-readable storage medium of claim 7, wherein the method comprises:

triggering the virtual switch to configure the logical network policy by forwarding a prior egress packet belonging to the packet flow towards the virtual switch.

11. The non-transitory computer-readable storage medium of claim 7, wherein processing the egress packet comprises:

generating the processed packet by updating source media access control (MAC) address information or destination MAC address information in the egress packet for forwarding to the destination over a logical layer-3 network.

12. The non-transitory computer-readable storage medium of claim 7, wherein processing the egress packet comprises:

generating the processed packet by encapsulating the egress packet with an outer header that is addressed from a first virtual tunnel endpoint (VTEP) associated with the virtualized computing instance to a second VTEP associated with the destination for forwarding to the destination via a physical network.

13. A computer system, comprising:

a processor;

a physical network interface controller (PNIC) enabled with Input/Output (I/O) virtualization; and a non-transitory computer-readable medium having stored thereon instructions that, when executed by the processor, cause the processor to perform the following:

assign a packet queue in a processing pipeline supported by the PNIC to a first virtual function, wherein the first virtual function is supported by the PNIC and assigned to a virtualized computing instance, and the processing pipeline is a component external to the first virtual function or a second virtual function of the virtual functions;

prior to detecting an egress packet, configure a logical network policy for a packet flow based on an instruction from a virtual switch associated with the virtualized computing instance;

receive the egress packet associated with the packet flow from the virtualized computing instance to a destination over a logical network, wherein the egress packet is received via the first virtual function;

steer the egress packet towards the packet queue in the processing pipeline by applying a filter associated with the first virtual function or content of the egress packet, or both;

process the egress packet using the processing pipeline to generate a processed packet, wherein processing the egress packet includes (a) retrieving the logical network policy associated with the packet flow from a datastore on the PNIC and (b) performing one or more actions according to the logical network policy; and forward the processed packet towards the destination via the second virtual function supported by the PNIC or a physical network connected to the PNIC.

14. The computer system of claim 13, wherein the instructions for steering the egress packet towards the processing pipeline cause the processor to:

identify a logical network tag assigned to the first virtual function via which the egress packet is received; and based on the logical network tag and a destination address specified by the egress packet, apply the filter to steer the egress packet towards the packet queue supported by the PNIC.

15. The computer system of claim 13, wherein the instructions for steering the egress packet towards the processing pipeline cause the processor to:

attach, to the egress packet, the tag that identifies a virtual local area network (VLAN) or virtual network identifier (VNI) associated with the first virtual function.

16. The computer system of claim 13, wherein the instructions further cause the processor to:

trigger the virtual switch to configure the logical network policy by forwarding a prior egress packet belonging to the packet flow towards the virtual switch.

17. The computer system of claim 13, wherein the instructions for processing the egress packet cause the processor to:

generate the processed packet by updating source media access control (MAC) address information or destination MAC address information in the egress packet for forwarding to the destination over a logical layer-3 network.

18. The computer system of claim 13, wherein the instructions for processing the egress packet cause the processor to:
generate the processed packet by encapsulating the egress packet with an outer header that is addressed from a first virtual tunnel endpoint (VTEP) associated with the virtualized computing instance to a second VTEP associated with the destination for forwarding to the destination via a physical network.

* * * * *